United States Patent
Jackson et al.

(10) Patent No.: US 6,798,789 B1
(45) Date of Patent: Sep. 28, 2004

(54) PRIORITY ENHANCED MESSAGING AND METHOD THEREFOR

(75) Inventors: Miles Randall Jackson, North Barrington, IL (US); Eric Paul Husen, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/238,956

(22) Filed: Jan. 27, 1999

(51) Int. Cl.[7] .............................. H04J 1/00; H04L 12/42
(52) U.S. Cl. ...................... 370/489; 370/389; 370/455; 340/825.5
(58) Field of Search ................................. 370/389, 444, 370/445, 455, 447, 460, 461, 388, 349, 448, 462, 489, 229, 230, 231, 235, 359, 360, 384, 410, 453, 490; 379/357, 93.09, 106.02; 455/419, 432, 446, 550, 552, 566; 340/825.5

(56) References Cited

U.S. PATENT DOCUMENTS

| | | | |
|---|---|---|---|
| 4,623,886 A | * | 11/1986 | Livingston .................. 370/462 |
| 5,353,287 A | * | 10/1994 | Kuddes et al. ............... 370/448 |
| 5,640,399 A | * | 6/1997 | Rostoker et al. ............ 370/392 |
| 5,761,534 A | * | 6/1998 | Lundberg et al. ............ 370/437 |
| 5,802,287 A | * | 9/1998 | Rostoker et al. .......... 370/395.5 |
| 5,881,247 A | * | 3/1999 | Dombrosky et al. ........ 710/100 |
| 6,021,129 A | * | 2/2000 | Martin et al. ................ 370/389 |
| 6,172,984 B1 | * | 1/2001 | Beyda et al. ................ 370/448 |
| 6,246,875 B1 | * | 6/2001 | Seazholtz et al. ........... 455/432 |

FOREIGN PATENT DOCUMENTS

| | | |
|---|---|---|
| GB | 2166320 | 4/1986 |
| JP | 580173932 | 10/1983 |
| WO | WO 95/12265 | 5/1995 |

OTHER PUBLICATIONS

J. Romkey, "A Nonstandard for Transmission of IP Datagrams over Serial Lines: SLIP", Jun. 1988, 6 pages.
W.Simpson, Editor, "The Point–to–Point Protocol (PPP)", *Daydreamer*, Jul. 1994, 52 pages.

\* cited by examiner

*Primary Examiner*—Afsar Qureshi
(74) *Attorney, Agent, or Firm*—Randall S. Vaas (57) ABSTRACT

A serial bus (106) communication protocol communicates data packets. When priority messages are identified, transmission of a data packet (302) being transmitted, if any, is interrupted. The priority message (402) is transmitted. Thereafter, transmission of an interrupted data packet is completed.

13 Claims, 8 Drawing Sheets

PRIORITY ENHANCED MESSAGING AND METHOD THEREFOR

FIELD OF THE INVENTION

The present invention pertains to interface protocols, and more particularly to priority messaging in a serial protocol.

BACKGROUND OF THE INVENTION

A variety of devices are known that include components, such as microprocessors, microcontrollers, digital signal processors, logic devices, peripherals, or the like, which communicate via a serial bus. Such devices include personal computers such as lap top and desk top computers, communication devices such cellular telephones, multiple application phones, personnel digital assistants, palm top computers, computer peripherals, and the like. For these devices, the components and the serial bus may be internal or external to the device.

Regardless of the application of the serial bus, protocols are often employed to frame data into discrete messages, or packets, by which data is transmitted over the serial bus. Additionally, such data links employ interconnects other than the serial transmit and receive wires to accommodate flow command signaling. If the number of interconnects is limited to a transmit and receive line, separate lines for flow control are not available. Accordingly, flow control has been included as part of the framing protocol.

When a framing protocol is applied to a serial bus, a trade-off is made between the maximum allowable latency for the link and the maximum allowable packet length. The longer the packet length, the longer the latency of the system to a message communication. For example, consider a link in which each byte requires 1 millisecond for transmission, and the maximum packet length is 100 bytes. If a high priority packet is submitted for transmission just after transmission of the first byte of a 100 byte packet is initiated, the system must wait a full second before the priority message can be sent.

One solution is to break up messages into packets small enough to accommodate the latency requirements for priority messaging, and then reassemble the packets into a complete message upon reception at the other end before passing the message on for processing. For example, by reducing the size of the packets to a maximum of 10 bytes, the priority message can be inserted with a latency of only 10 milliseconds. However, this adds a considerable amount of overhead in constructing longer messages and reassembling them. This can slow down the receive processing of the messages. Additionally there are numerous error conditions which can occur because of the complexity of such a system. Consequently, the protocols to implement such a solution increase overhead, increase the chances of error, and are fairly complex to implement.

Accordingly, there is a need for an improved protocol for accommodating priority messages which does not negatively impact on the performance of the communication protocol.

DETAILED DESCRIPTION OF THE DRAWINGS

A serial bus communication protocol communicates data. When a priority message is to be communicated, active transmission of data, if any, is interrupted. The priority message is communicated. The interrupted transmission of the data packet is then completed. The priority messaging routine provides a versatile communication protocol which is effective even where a minimal number of interconnects are desired. The protocol provides low latency priority messaging in addition to effective transmission of packetized messages.

Figure 1:
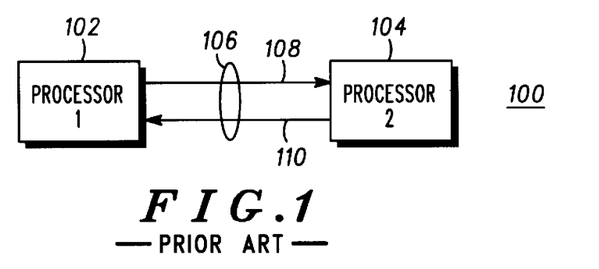
FIG. 1 is circuit schematic in block diagram form illustrating two components interconnected by a serial bus according to the prior art.

A communication system 100 (FIG. 1) includes a first component, illustrated as a processor, 102 and a second component, illustrated as a processor, 104, interconnected by a serial bus 106. The serial bus includes a transmit wire 108 for signals communicated from processor 102 to processor 104 and a receive wire 110 for signals communicated from processor 104 to processor 102. No additional interconnects are required for the serial bus other than a common reference, such as ground.

The components, or processors, 102, 104 may include microprocessors, microcontrollers, digital signal processors, logic devices, peripherals, or any other device which communicates via a serial bus. The communication system may be within a single device such as a personal computer, a personnel digital assistant, a palm top, a communication devices such as a cellular telephone or a land line telephone, or the communication system may include external devices such as computer peripherals, radiotelephone peripherals and the like.

Figure 2:
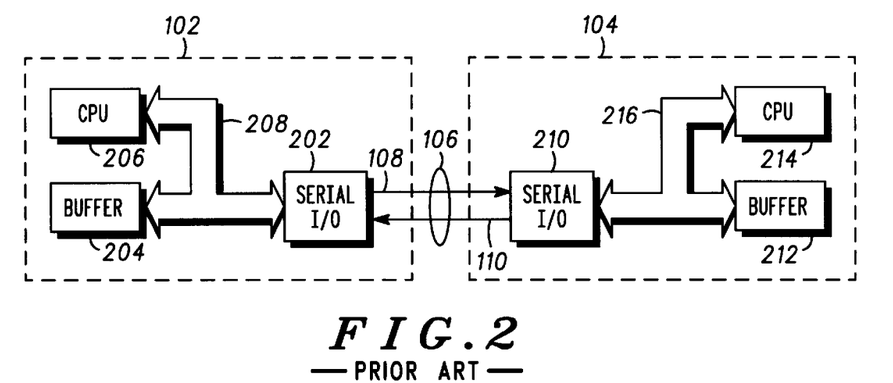
FIG. 2 is circuit schematic in block diagram form illustrating the serial bus for the components according to FIG. 1 in greater detail according to the prior art.

Processor 102 includes a serial input/output (I/O) 202. A buffer 204 for incoming and outgoing data and a central processor unit (CPU) 206 are connected to the serial I/O 202 via a data bus 208. Processor 104 similarly includes a serial I/O 210. A buffer 212 for incoming and outgoing data and a CPU 214 are interconnected with the serial I/O 210 via a data bus 216.

Figure 3:
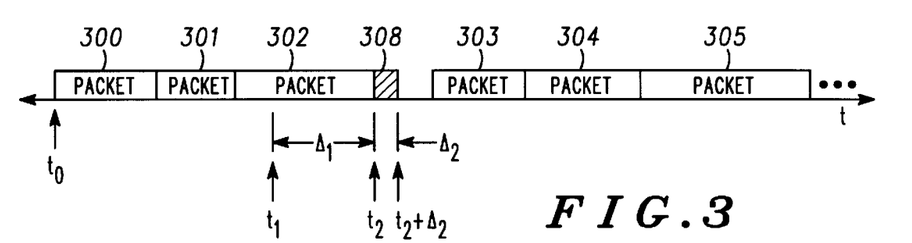
FIG. 3 is a schematic illustrating insertion of a priority message between message packets.

Data communicated between the processor 102 and the processor 104 are formatted into packets, or messages, 300–305 (FIG. 3). During communication, the data packets are sequentially communicated on the serial bus. If at time t1, a request for transmission of a priority message 308 is generated within processor 102, the message will be transmitted at time t2, which is at the end of the data packet 302. Thus a delay of Δ1 is experienced. The priority message has a time duration of Δ2, which is short relative to packet lengths employed in the present invention. If the data packet is long, the transmission of the priority message may be delayed too long for effective operation. Where priority messages require an immediate response, the delay may be so long as to result in user perceptible delay or system malfunction.

Figure 4:
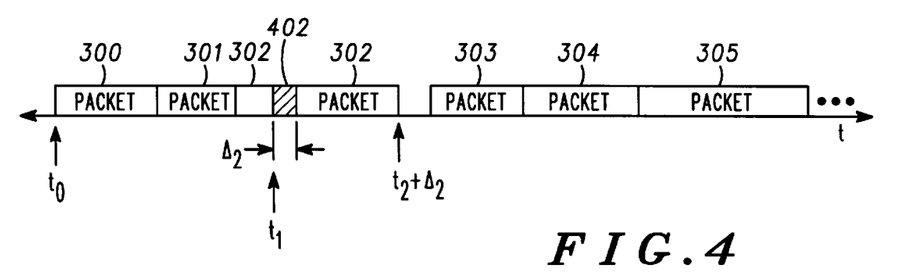
FIG. 4 is a schematic illustrating insertion of a priority message within an ongoing packet message.

An improved priority message protocol inserts the priority message 402 (FIG. 4) into packet 302 very shortly after reception of the request at time t1. By communicating the message when it is generated, user perceivable delay is avoided. The packet 302 is interrupted, such that a portion of the packet is transmitted before the priority message and a portion is transmitted immediately after the priority message. In either case if another packet followed immediately after packet 302, it would be delayed in either case only by Δ2, which is a small delay. A method by which the priority message can be inserted without negatively impacting on the communication of data packets will be described hereinbelow.

The improved serial I/O uses command signals and serial I/O messages. There are only nine command signals defined in the priority-enhanced serial line interface protocol (PSLIP), although fewer or more can be used. The nine command signals are initiated by an ESCAPE character, such as $DB, wherein "$" indicates that the values following it are hexadecimal. The next character following the ESCAPE character is a command character, such as the PRIORITY character, which identifies the command signal. The PRIORITY character may optionally include a channel indicator. The channel indicator is used where the system may have more than one destination for the priority message. The command signal thus identifies that it is a priority message and the channel indicates where it is to go. The two bytes that follow the priority character identify the priority message. The values of these bytes are not critical, but may have any desired value as needed by the system.

The ESCAPE character is used to indicate that processing of subsequent bytes are to be other than routine processing. The ESCAPE character initiates interruption of the ordinary data exchange. The escape character precedes each of the START OF PACKET character, a START ACKNOWLEDGE character, a START NOT ACKNOWLEDGED character, an INSERT ESCAPE character (instructs the receiving entity to insert an ESCAPE character in the message buffer), a SUSPEND character, a SUSPEND ACK character, a RESUME character, a RESUME ACK character, and a HIGH PRIORITY MESSAGE character. These are the nine command signals that are defined by the envisioned priority-enhanced serial line interface protocol, PSLIP. These command signals are inserted as needed by the transmit processing routine and interpreted as received by the receive processing routine.

Figure 10:
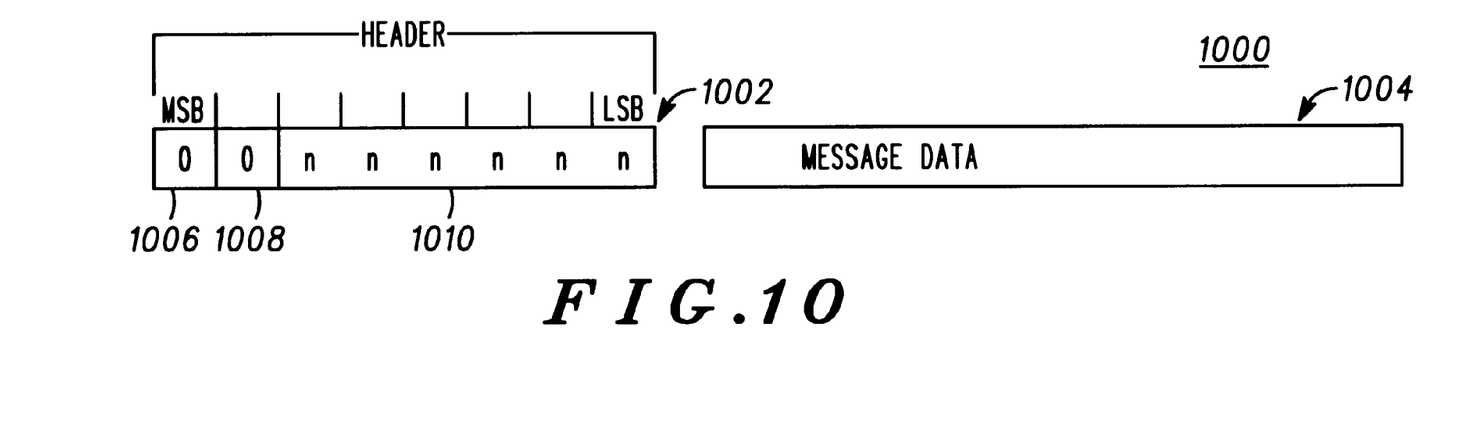
FIG. 10 illustrates a multiplexing header for a data message.
Figure 11:
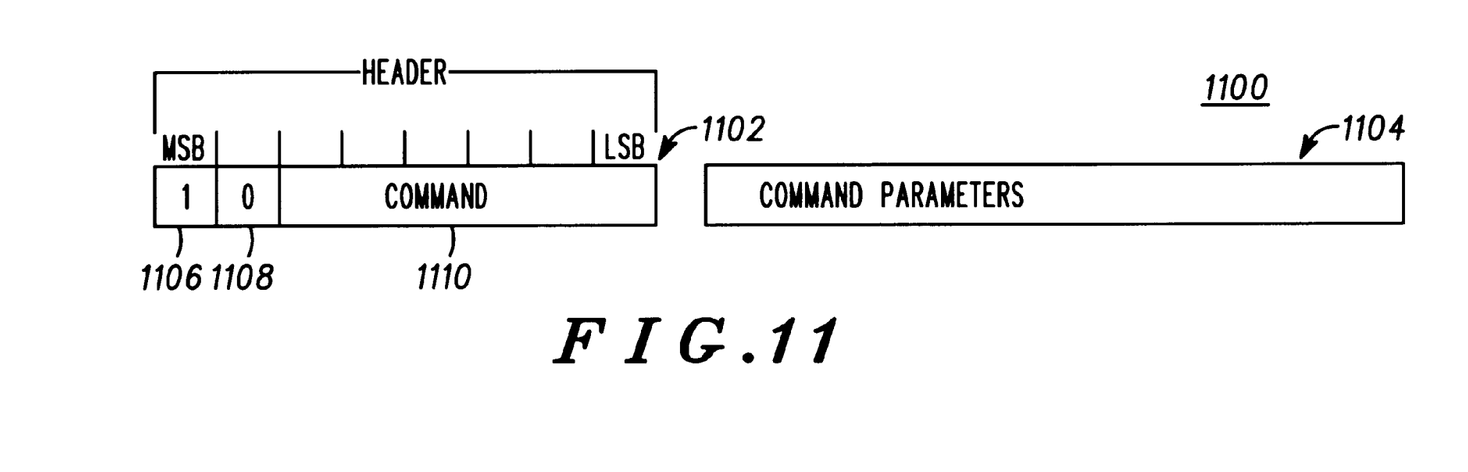
FIG. 11 illustrates a header for a command message.

As indicated above, the system also has serial I/O messages. Serial I/O messages may be either data messages 1000 (FIG. 10) or control commands 1100 (FIG. 11). The message type is differentiated by the highest order bit of the first byte of the serial I/O message. This bit is referred to as the type field. The type field has a value of zero (0) for data messages and one (1) for command controls. The format of the remainder of the messages is dependent on the message type.

In particular, each serial I/O data message 1000 (FIG. 10) contains a routing header 1002 and the message data 1004. The routing header consists of a single byte that is added to the front of each message data. The header contains a type field 1006, a reserve field 1008 and a port, or connector, identifier field 1010. The type field is set to a value of zero (0) to indicate that it is a data message. The reserved field is unused. It can be used for additional functionality, such as error detection and recovery. The reserved field should always be transmitted with a value of zero. The receiving device at the other end of the serial bus will ignore this bit. The port identifier field specifies the destination port for the message attached thereto. Using a six bit port identifier permits up to 64 connectors to be supported as mentioned above. As used herein, a port is a connector. The data 1004 can be of any format, and for example may be data or control signals, and may have any format.

The serial I/O control command 1100 (FIG. 11) includes a command header 1102 consisting of a single byte, and command parameters 1104. The type field 1106 is a one located at the highest order bit in the header. The next bit 1108 is reserved, although it will always be communicated as a 0. The receiving device at the other end of the serial bus will ignore this bit. The next six bits are the command field 1110. The command field identifies the control command being communicated. The command parameters 1104 are different for each of the commands.

Six control commands are envisioned for the improved system, though up to 64 can be supported, or fewer can be used. The six control commands include Multiple serial I/O (MSIO) ESTABLISH REQUEST, MSIO ESTABLISH RESPONSE, PORT OPEN REQUEST, PORT OPEN RESPONSE, PORT CLOSE REQUEST, and PORT CLOSE RESPONSE. The MSIO ESTABLISH REQUEST is used by a requesting component 102 to set up a connection and declare a maximum number of ports for that connection. The MSIO ESTABLISH RESPONSE is the response sent by the component 104 being requested to complete connections and is used to negotiate the maximum number of ports allowed to be open on the connection. The PORT OPEN REQUEST is used to request opening a port. The PORT OPEN RESPONSE is used to accept or reject a request to open a port. The PORT CLOSE REQUEST is used to request that a port be closed. The PORT CLOSE RESPONSE is used to respond to a port close request by replying as to whether the port can be closed. The control commands are thus used by the components 102 and 104 connected via the serial bus 106 to negotiate connections.

In operation, after a connection is established, but prior to transmission, the transmitting entity, processor 102 for example, communicates the length of the packet to be communicated. The receiving entity, processor 104 for example, responds by either sending an ACKNOWLEDGMENT character if its buffer is long enough or a NO ACKNOWLEDGMENT character if its buffer is not long enough. Acknowledgment will result in active communication.

At any time during a communication, the receiving entity can transmit a SUSPEND character. The transmitting entity replies with a SUSPEND ACKNOWLEDGMENT character, and can not transmit packet messages again until it receives a RESUME character from the entity requesting the suspension.

It is envisioned that the SUSPEND message will be communicated by a receiving component 104 if the buffer 212 associated therewith is about to be full because information is being received faster than the CPU 214 and buffer 212 can process it. This suspension protocol will thus help avoid losing data in such a situation. Additional protection against errors is provided by requiring that any bytes being transmitted be completed before the communication is suspended.

When the receiving entity, processor 104, is ready to continue following a suspension, a RESUME character is transmitted to the other entity, processor 102. The other entity (processor 102) communicates a RESUME ACKNOWLEDGE character. The active communication state will then be resumed by processors 102 and 104.

The suspend state, initiated following a SUSPEND message, does not apply to the nine command signals of the PSLIP protocol. This includes the high priority command. Thus priority messages are still communicated when the link is in the suspend state. Additionally, during suspension of transmission of packet messages in one direction, for example from component 104 to component 102, packet messages in the other direction may still be transmitted, from component 102 to component 104.

Figure 9:
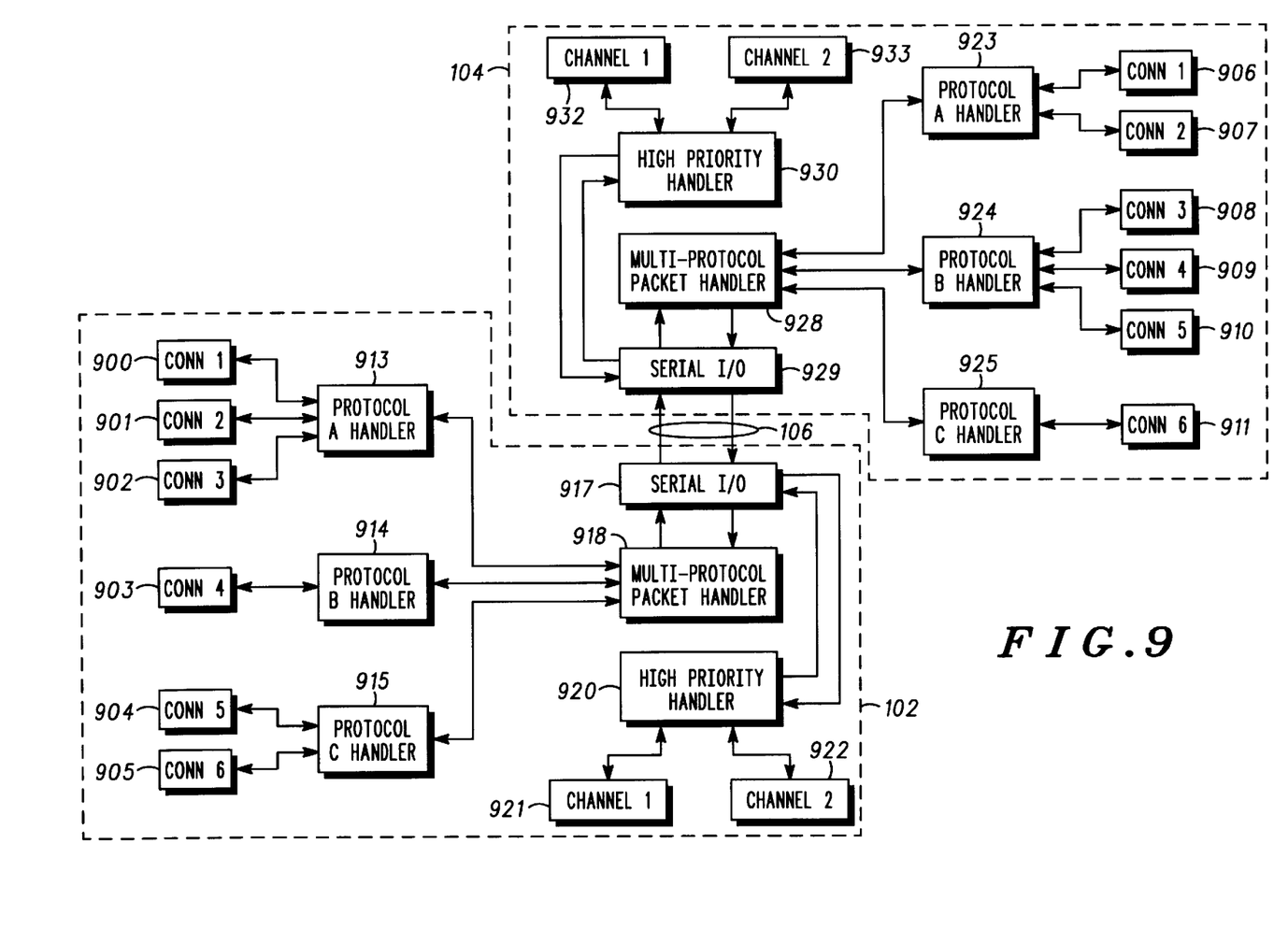
FIG. 9 is a schematic illustrating message routing in a serial bus.

The operation of a system having components 102, 104 (FIG. 2) at ends of a two-wire bus, serial bus 106, will now be described in further detail with reference to FIG. 9. Those skilled in the art will recognize that additional connections (not shown) could be provided on the two-wire bus. The schematic shows six connections at each end. Connections 900–905 are each associated with a respective entity associated with the component 102. For example, the entities can be handling routines for power control, keypad, audio, or display, and the connections 900–911 are interfaces between these handling routines. Any number of connections can be supported, but it is envisioned that 64 connections are supported by six identifier bits described hereinbelow.

Connections 900–902 are coupled to a protocol A handler 913. Connector 903 is coupled to a protocol B handler 914. Connectors 904 and 905 are coupled to protocol C handler 915. The protocol handlers 913–915 can each communicate messages having the same or different protocols, and are connected to a multi-protocol packet handler 918, which directs all non-priority messages to the appropriate protocol handler 913–915. Serial I/O 917 processes all data communicated via serial bus 106. Priority messages, or command signals representing the priority message, are passed from the serial I/O directly to the priority message handler 920. The priority message handler directs the priority messages to the appropriate channel 921, 922. In a radiotelephone, the high priority messages can be used for power fail warnings and audio confirmation of key presses, for example. Audio feedback for key presses is described hereinbelow.

Connections 906–907 are coupled to a protocol A handler 923. Connector 908–910 are coupled to a protocol B handler 924 . Connector 911 is coupled to protocol C handler 925. The protocol handlers 923–925 are connected to multi-protocol packet handler 928, which directs all non-priority messages to the protocol handlers 923–925. Serial I/O 929 processes all data communicated via serial bus 106. Priority messages are passed from the serial I/O directly to the priority message handler 930. The priority message handling may advantageously take place by routing priority messages from the serial I/O directly to the destination designated by channel information in the priority message. Alternately, the CPU 214 can provide a brief handling routine which results in minimal buffering before the priority messages are communicated to the appropriate destination. The priority message handler directs the priority messages to the appropriate channel 932, 933.

The number of high priority channels is limited to sixteen as there are only four bits allocated to priority channel identification. This is acceptable because the number of entities having high priority message capability is limited. If the mechanism is overused, an excessive amount of time will be spent on priority message routing and queuing of less important messages. If the time is too long, the system would be unable to deliver high priority messages as they would be queued behind other high priority messages that may not in fact be truly high priority. Thus, messages which must be communicated high priority for the system to function properly are the only messages that will be given high priority capability. By providing limited high priority messaging, powerful capability to uniquely deliver messages efficiently is provided for priority messages.

Additionally, more than one priority message can be sent sequentially, but those skilled in the art will recognize that too many sequential priority messages will result in a queue that is so long that the priority message will be delayed beyond a desirable length. Accordingly, it is desirable for the number of messages that the system permits to have a priority status be limited.

When a port is first opened, the packet handlers 918, 928 at each end of the serial bus 106 use control commands (described above) to negotiate various features of the ports. A set of command messages are passed between the packet handlers 918, 928 to accomplish this setup. After set up, the port is available for use until it is closed using another set of control commands.

The serial I/Os 917, 929 do not look at the content of the messages. This permits the framing routine to quickly build messages and place them in a message queue where they can then be processed by a lower priority multi-protocol packet handler. The serial I/Os 917, 929 can immediately process high priority messages without latency associated with lower priority packet handling.

The different protocol handlers 913, 915, 923 and 924 can implement further routing. Alternatively, the different protocol handlers 914, 925 may implement only a single connection. In the illustrated embodiment, some of the independent protocol handlers implement single connection while other of the independent protocol handlers implement further routing.

Figure 5:
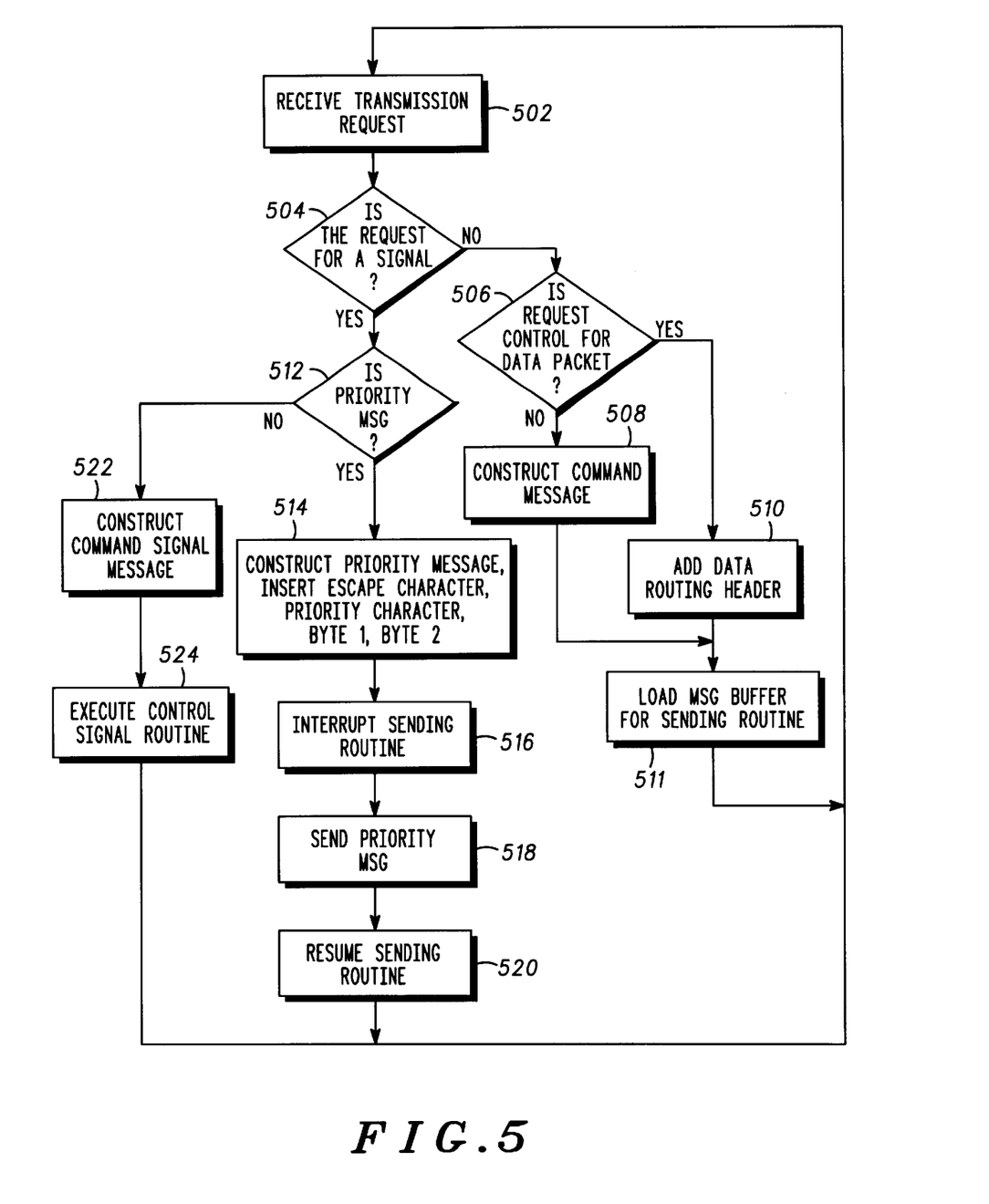
FIG. 5 is a flow chart illustrating transmit message processing.

Operation will now be described in further detail with respect to communication from processor 102 (FIG. 2) to processor 104, although it will be recognized that the description applies equally to the transmission of information from processor 104 to processor 102. A transmission request is received, as indicated in block 502 (FIG. 5). The CPU 206 will determine if the transmission request is a request for transmission of a command signal as indicated in block 504. If not, the CPU 206 will determine whether the transmission request is a data packet, as indicated in decision block 506. If it is not, it is a control command, and the CPU constructs a command message based upon the command, as indicated in block 508. The CPU 206 then queues the command message for transmission, as indicated in block 511, and returns to receive the next request. Queued messages are loaded into a buffer 204, and the sending of the messages are handed over to a sending routine which empties the buffer onto the transmit wire 108.

If it was determined in block 506 that the message was a data packet, the message is data. Accordingly a data routing header is added to the data message as indicated in block 510. The message is loaded into a buffer 204, and the sending of the message is handed over to a sending routine which empties the buffer onto the transmit wire 108, as indicated in block 511.

If it was determined in decision block 504 that the message is a command signal, the CPU 206 determines whether the command signal is a priority message in decision block 512. If it is a priority message, the priority message is constructed as indicated in block 514. The sending routine is interrupted, if a message is currently being transmitted, as indicated in block 516. The priority message is sent, as indicated in block 518. The sending routine is then resumed so that the remainder of the interrupted message can be communicated, as indicated in block 520.

If it was determined that the command signal was not a priority message, the command signal message is constructed in block 522. The signal message is then loaded into the transmission buffer for processing according to the command signal routine.

The protocol for receiving messages will now be described with reference to FIGS. 2, 6, 7 and 8. It will be recognized that processor 102 and processor 104 each perform both transmission and reception identically, although the receive operation is described only with respect to processor 104. The receive process includes receiving data bytes via the serial I/O 210 as indicated in block 602. The CPU 214 will determine if the byte is an escape character, indicating a command signal, in block 604. If it is not an escape character, the CPU 214 will wait for reception of an escape character. If the received byte is an escape character, the CPU 214 receives the command byte following the ESCAPE character as indicated in block 605. The CPU 214 then determines whether a START PACKET message is received as indicated in block 606. If it is not a START PACKET message, then the CPU 214 processes the command signal, as will be described in greater detail hereinbelow.

Figure 6:
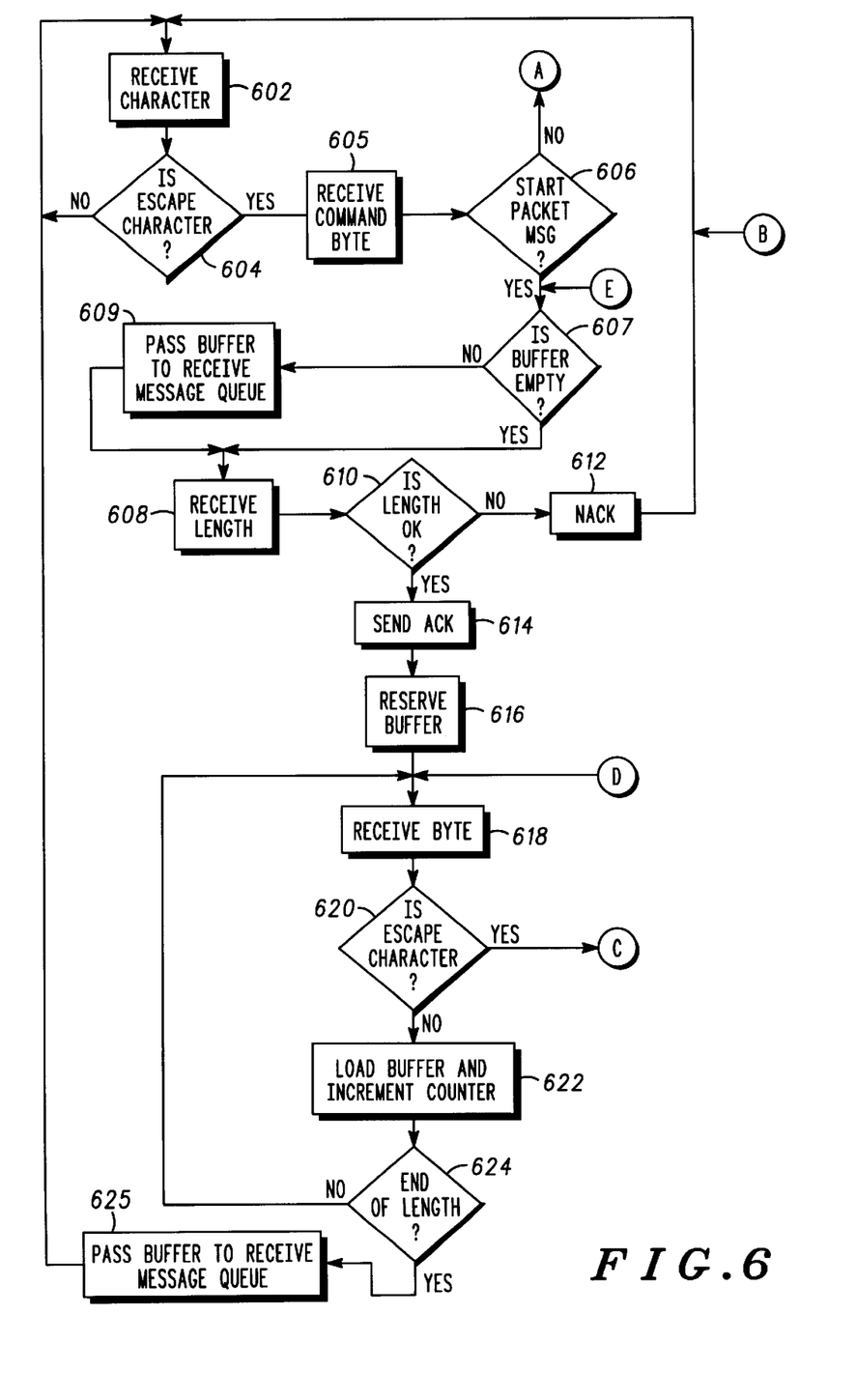
FIG. 6 is a flow chart illustrating receive message processing.

If the message is a START PACKET message as determined in decision block 606, the CPU 214 determines whether the receive buffer is empty, in decision block 607. If it is empty, the CPU 214 proceeds to block 608. If it s not empty, the contents of the receiver buffer are passed to the receive message queue, as indicated in block 609. As indicated in block 608, the CPU 214 receives the message length. The CPU 214 then determines whether the length is acceptable as indicated in decision block 610. The length will be unacceptable if it is longer than the length currently available for buffer 212, it is longer than previously negotiated, or it is zero. If the length is unacceptable, the CPU replies with a START NACK message as indicated in block 612, and returns to receive the next character. As used herein, a character is a byte long, and a byte is equal to an octet, all of these being eight bits long.

If it was determined that the length of the message is acceptable, the CPU 214 sends a START ACKNOWLEDGMENT as indicated in block 614. The buffer is then reserved for the message length, as indicated in block 616.

The next byte is then received from serial I/O 210 as indicated in block 618. The CPU 214 determines whether the byte is an escape character in decision block 620. If it is not an escape character, the buffer is loaded and a counter tracking the number of bytes loaded is incremented, as indicated in block 622. The CPU 214 then determines whether the counter indicates that the end of the message has been reached, as indicated in decision block 624. If not, the CPU receives the next byte. If it is determined that the end of the message is received, the CPU passes the contents of the receive buffer to a receive message queue, as indicated in block 625, and returns to step 602 to receive the next character.

If it was determined in decision block 606 that the command character did not indicate a START PACKET message, the CPU 214 must continue processing the command signal. The processing of the command signal is described with respect to FIG. 7. The command signal is a byte following the escape character, and is received as indicated in block 605. If the command is not a priority character, as determined in decision block 704, the command signal is processed in block 706, after which the CPU 214 returns to receive the next byte.

Figure 7:
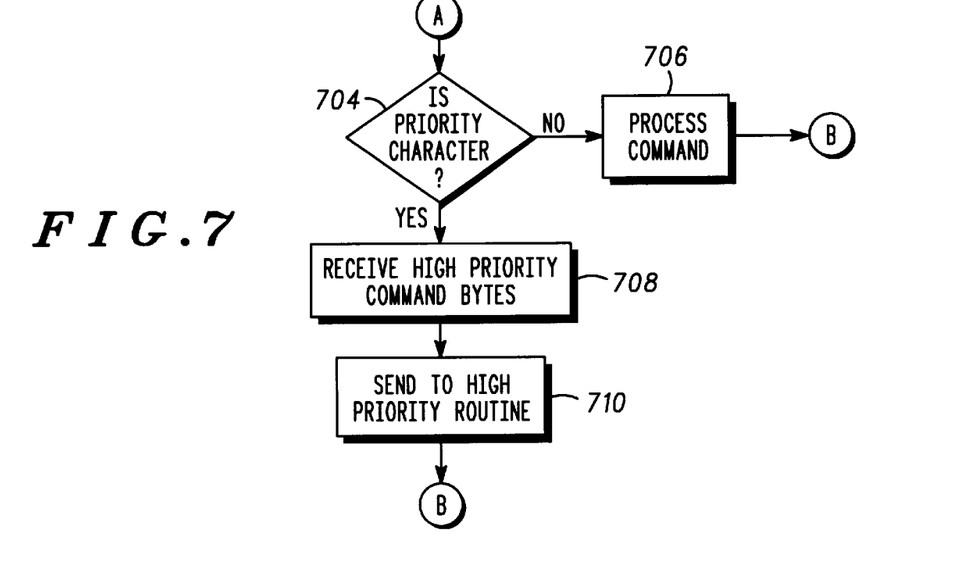
FIG. 7 is a flow chart illustrating receive processing of priority messages.

If it was determined in decision block 704 that the command byte is a priority command character, then the CPU 214 receives the data bytes following the priority command, as indicated in block 708. The CPU 214 then sends the high priority command to the appropriate channel, as indicated in block 710, and returns to receive the next byte.

Figure 8:
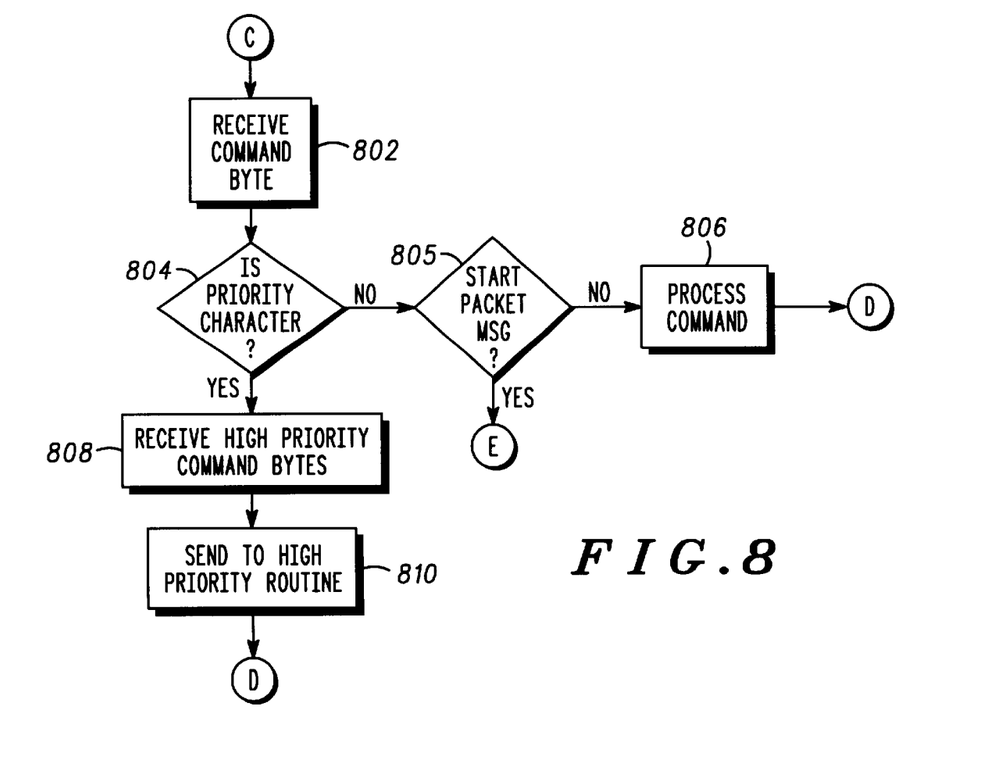
FIG. 8 is a flow chart illustrating receive processing of priority messages during packet reception

If it was determined in decision block 620 that the escape character is present, the CPU 214 must receive the command signal. The processing of the command signal is similar to that described with respect to FIG. 7. The command byte is received as indicated in block 802 (FIG. 8). If the command byte is not a priority character, as determined in decision block 804, the CPU 214 determines whether the command byte indicates a START PACKET message as indicated in decision block 805. If not, the command is processed as indicated in block 806, after which the CPU 214 returns to receive the next byte in step 618 (FIG. 6). If it was determined in decision block 805 (FIG. 8) that the command byte identified a START PACKET message, the CPU 214 goes to step 607, to initiate reception of the message packet.

If it was determined in decision block 804 that the command byte is a priority command character, then the CPU 214 receives the data bytes following the priority command, as indicated in block 808. The CPU 214 then sends the high priority command to the appropriate channel, as indicated in block 810, and returns to receive the next byte at step 618. As bytes are received, following a yes decision in block 620, the counter is not incremented, such that additional bytes are not loaded into the buffer 212 in memory allocated to the received message data. This insures that a priority message will not interfere with the completion of the transmission of the interrupted packet.

Figure 12:
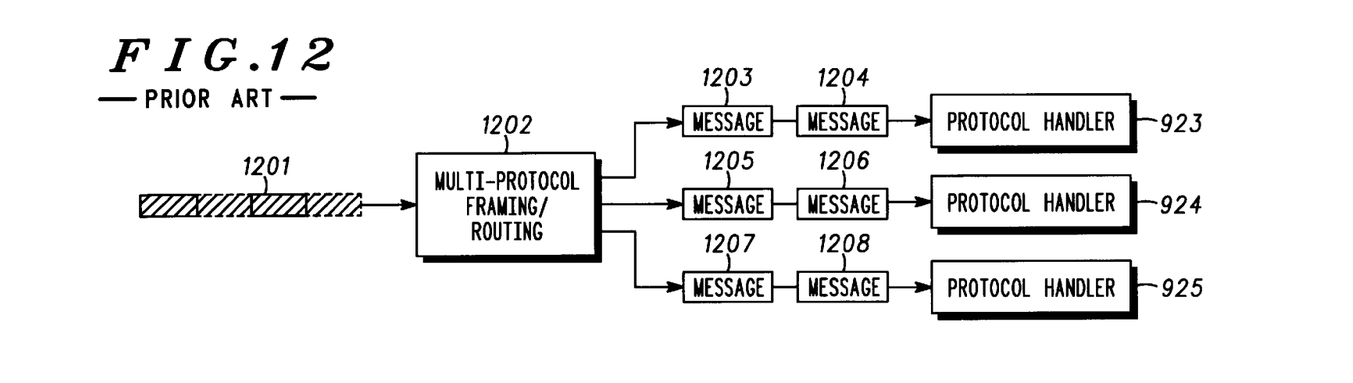
FIG. 12 is a schematic illustrating data framing/routing according to the prior art.

As illustrated in FIG. 12, ordinarily, a stream of data 1201 is input to a multi-protocol framing/routing process 1202. The framing/routing process 1202 opens the messages as they are received to frame and route the messages. The resulting framed data messages 1203–1208 are directed to their respective protocol handlers 923–925 which results in a service routine being performed. Additional complication and delay is provided when packets are communicated that use different packet protocols. In this situation, the single framing/protocol process 1202 is used to open all of the packets, which are opened in the order that they are received. The routing decision to be made for a high priority message would thus be delayed by the framing and identification protocols of preceding data messages queued in the multiple-protocol framing/routing process 1202.

Figure 13:
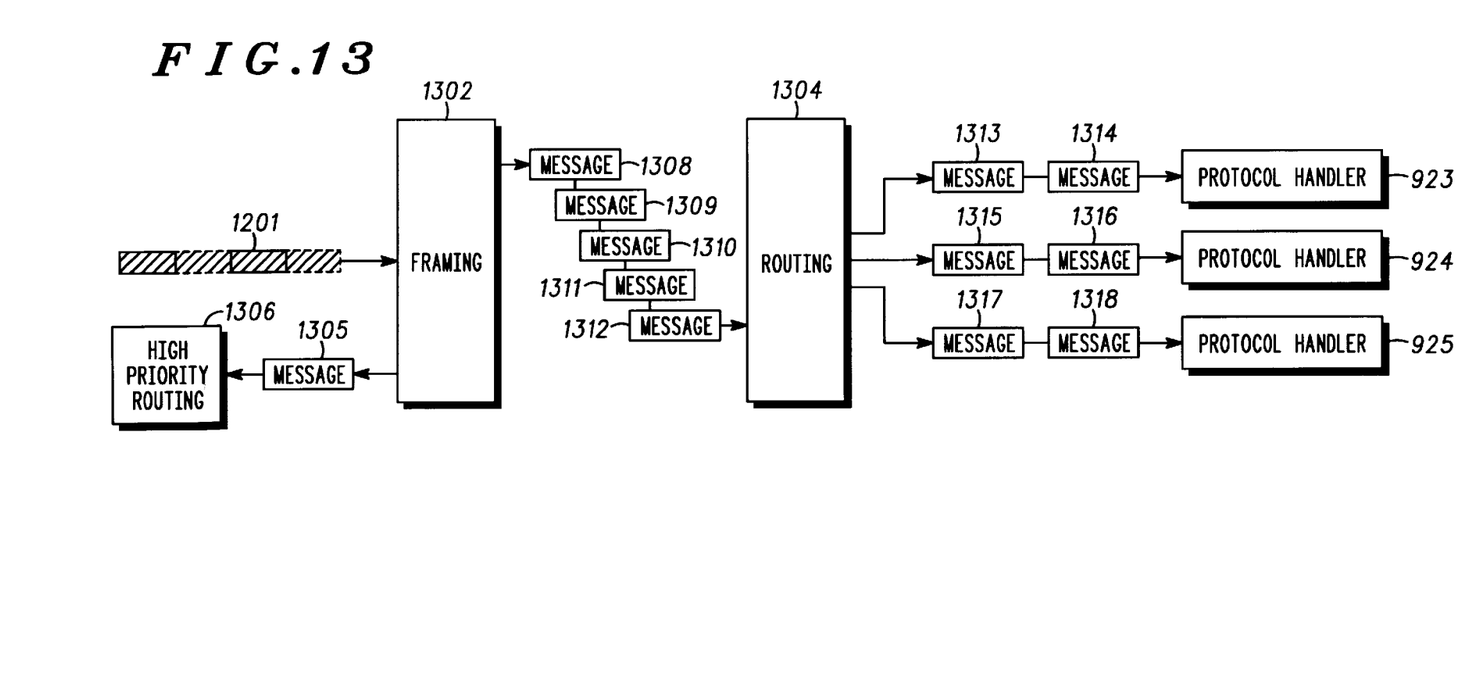
FIG. 13 is a schematic illustrating an improved data framing and routing method.

The PSLIP signal START PACKET can be advantageously employed to frame the messages in a framing process 1302 (FIG. 13). The framed messages 1308–1312 which are not high priority message are routed to router 1304. The high priority messages 1305 are routed for high priority routing 1306. The framing 1302 and high priority routing 1306 take place in the serial I/O 202, 210. Router 1304 can take place in the serial I/O together with the multi-protocol packet handler 928. Each message is routed to the appropriate buffer which is associated with respective ones of protocol handlers 923–925 prior to opening the message. This allows the non high priority messages 1305 to be handled from their buffers by the multi-protocol packet handler 928, and protocol handlers 923–925 (FIG. 9) on a low priority basis without delaying high priority messages which are routed to the high priority protocol handler 920 (or directly to the appropriate channel). This separates the routing task from the framing task for messages 1313–1318. Additionally, the use of the header permits the routing to be independent of the framing, or protocol, of the enclosed message data for each connector. Additional prioritizing can take place within the router 1304 and protocol handlers 923–925, wherein messages can be prioritized before the messages are opened based upon the information in the routing header and/or data packets.

Figure 14:
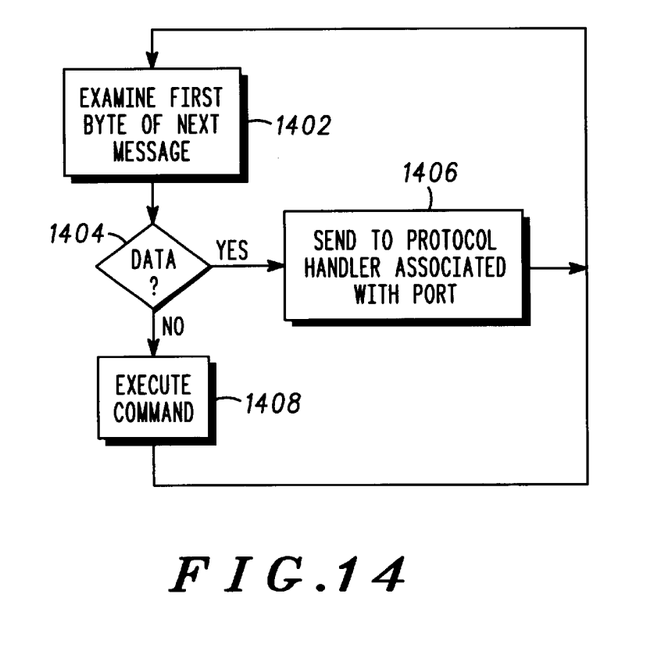
FIG. 14 is a flow chart illustrating routing using the routing header.

The routing can be implemented very quickly because of the added routing headers. The processing of the headers will now be described. The priority messages and command signals will be removed as described above. For the remaining messages, the first byte of the next message received from the serial bus 106 is examined by CPU 214, as indicated in block 1402 (FIG. 14). It is then determined whether this byte, the added routing header, is a data header in decision block 1404. If the routing header is a data header, the message is routed to the protocol handler associated with the port identified in the data routing header, as indicated in block 1406. No additional protocol analysis need be done at this time. If it is determined that the message was a command, CPU 214 executes the command as indicated in block 1408. The messages can thus be routed to a buffer associated with the protocol handler identified, without the multi-protocol header having to determine what protocol is being used for the message. The routing header can be removed when the message is passed to the individual protocol handlers 923, 924, 925.

Figure 15:
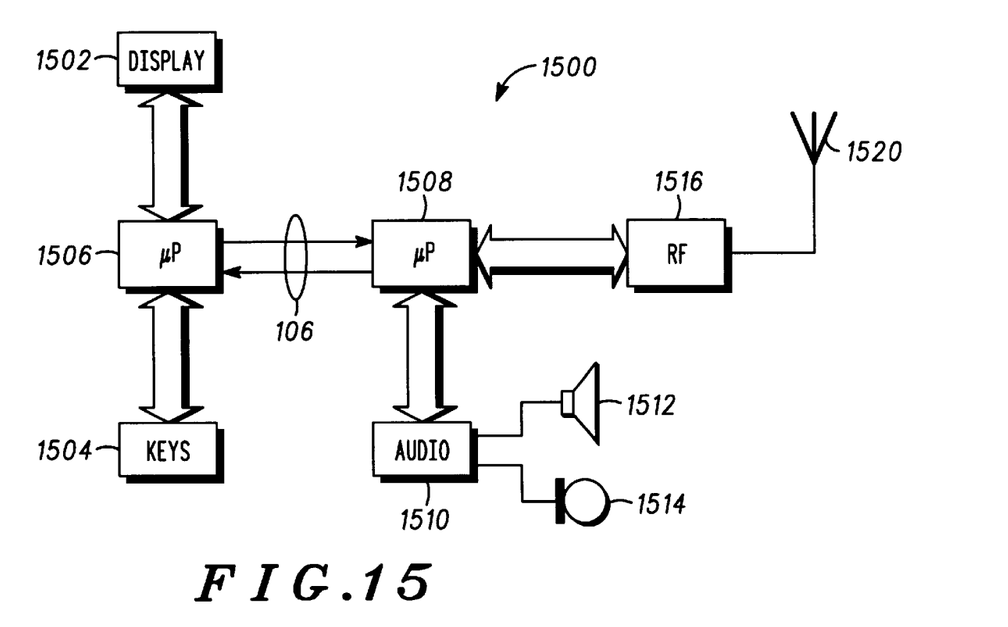
FIG. 15 is a circuit schematic in block diagram form illustrating a radiotelephone including a serial bus.

The serial bus according to the invention can be advantageously employed in a radiotelephone 1500 (FIG. 15). The radiotelephone 1500 includes a display 1502 and keys 1504 coupled to a microprocessor 1506. The microprocessor 1506 is connected to microprocessor 1508 via the serial bus 106. The microprocessor is coupled to an audio circuit 1510 and a radio frequency transceiver 1516. The audio circuit drives a speaker 1512 and receives signals from microphone 1514. The radio frequency (RF) circuit communicates with other devices (not shown) via antenna 1520.

Priority messages can be used for producing audible tones responsive to user actuation of the keys 1504 in such a radiotelephone where the keypad is connected to one of the processors 1506 and a speaker is connected to the other processor 1508. If the delay time is too long, the audible indication that a key was pressed will not occur rapidly enough to provide meaningful feedback of keypad actuation, resulting in the user pushing the key again.

The improved protocol herein permits the packets, or messages, 300–305 (FIG. 3) to have any convenient data length without interfering with priority messaging. The data packets may for example be hundreds or thousands of bytes in length. For very long packets, transmission of the priority message prior to completion of packet transmission will greatly reduce the latency experienced by the priority message.

Thus it can be seen that the priority interrupt protocol facilitates rapid communication of a priority message. This is accomplished in part by providing a very short priority message. Additionally it can be seen that a priority message protocol is disclosed which permits a transmitting entity to insert a priority message into a packet of data without having to wait for completion of transmission of the packet in progress, thereby reducing the latency of the priority message handling. Additionally, multi-protocol routing disassociated from the framing protocol allows the multi-protocol packet handling to occur in a lower priority process than that of message framing and high priority message handling.

We claim:

1. A method of providing a serial bus communication protocol communicating data packets, comprising the steps of:

initiating transmission of a data packet;

identifying a priority message;

interrupting transmission of the data packet being transmitted;

transmitting the priority message; and completing transmission of the interrupted data packet by transmitting the portion of the packet following the interruption without transmitting the entire interrupted data packet and without transmitting another header for the interrupted data packet.

2. The method as defined in claim 1, further including the step of transmitting at least one additional priority message prior to completing transmission of an interrupted data packet.

3. The method as defined in claim 1, wherein the transmitting of priority messages takes place simultaneously with receiving at least one message.

4. A method of receiving data from a serial bus comprising:

determining whether a priority message is received;

if a priority message is received while an active packet message is being received, interrupting reception of the active packet message;

routing the priority message;

resuming reception of the interrupted packet message after the priority message is received by receiving a headerless residual of the active packet message; and assembling the interrupted packet message from a first portion of the packet message received before the interrupt and the headerless residual to complete the interrupted packet message, wherein the first portion of the interrupted message is only received before the interrupt.

5. The method as defined in claim 4, further including the step of receiving at least one additional priority message prior to resuming reception of an interrupted data packet.

6. The method as defined in claim 4, wherein receiving the priority message takes place while simultaneously transmitting at least one message.

7. The method as defined in claim 4, wherein when a received message is a command, further including the step of executing the command.

8. A radiotelephone comprising:

a key;

a speaker;

a first processor coupled to the key;

a second processor coupled to the speaker; and a serial bus coupled between the first processor and the second processor, wherein the first processor is responsive to actuation of the key to generate a priority message for transmission to the second processor, the first processor interrupting transmission of data packet, if any, being communicated from the first processor to the second processor and transmitting a priority message to the second processor and the second processor responsive to the priority message to cause an audible alert to be produced, the first processor resuming transmission of the interrupted data packet after sending the priority message.

9. A method of receiving data from a bus, comprising the steps of:

receiving a first portion of a data packet;

receiving a priority message interrupt;

receiving the priority message;

routing the priority message to priority message handler;

receiving a second portion of the data packet following the priority message, wherein the second portion is a headerless residual of the data packet; and combining the first portion of the data packet received prior to the priority message with the second portion of the data packet received after the priority message to complete the data packet.

10. The method as defined in claim 9, further including the step of providing the combined packet to a framer.

11. A method of communicating data packets, comprising the steps of:

initiating transmission of a data packet;

identifying a priority message;

interrupting transmission of the data packet being transmitted;

transmitting the priority message; and completing transmission of the interrupted data packet without an additional header by transmitting only a portion of the data packet remaining following the interruption of the priority message.

12. The method as defined in claim 11, further including the step of transmitting at least one additional priority message prior to completing transmission of an interrupted data packet.

13. The method as defined in claim 11, wherein the transmitting of priority messages takes place simultaneously with receiving at least one message.

* * * * *